(12) United States Patent
Kim (10) Patent No.: US 8,694,001 B2
(45) Date of Patent: Apr. 8, 2014

(54) SYSTEM AND METHOD FOR OBTAINING IDENTITY NUMBER OF USER EQUIPMENT IN AN LTE SYSTEM

(75) Inventor: Shin-Jae Kim, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 165 days.

(21) Appl. No.: 13/233,335

(22) Filed: Sep. 15, 2011

(65) Prior Publication Data

US 2012/0064892 A1 Mar. 15, 2012

(30) Foreign Application Priority Data

Sep. 15, 2010 (KR) ......................... 10-2010-0090710

(51) Int. Cl.
*H04W 4/00* (2009.01)
(52) U.S. Cl.
USPC ..................... 455/435.1; 455/411; 455/432.1; 455/561
(58) Field of Classification Search
USPC ........ 455/435.1–435.3, 410–411, 432.1, 561; 370/329
See application file for complete search history.

(56) References Cited

U.S. PATENT DOCUMENTS

| 2007/0213039 A1* | 9/2007 | Skog ......................... 455/414.3 |
| 2008/0182596 A1 | 7/2008 | Wang et al. |
| 2010/0075635 A1 | 3/2010 | Lim et al. |
| 2011/0090857 A1* | 4/2011 | Guo .............................. 370/329 |
| 2012/0082037 A1 | 4/2012 | Wang et al. |

FOREIGN PATENT DOCUMENTS

| EP | 2259545 A1 * | 12/2010 |
| KR | 10-2000-0114455 A | 11/2009 |
| KR | 10-2010-0034885 A | 4/2010 |

* cited by examiner

*Primary Examiner* — Marcos Torres
(74) *Attorney, Agent, or Firm* — IP Legal Services, LLC

(57) ABSTRACT

System and method for obtaining identity number of user equipment in an LTE system. An identity number of a user equipment may be obtained at an eNodeB in an LTE network having an MME. In order to obtain the identity number, the eNodeB may receive a first message from the user equipment and extract a first part of an identity number of the user equipment from the received first message. The eNodeB may receive a second message from the MME and extract a second part of the identity number of the user equipment from the second message. The eNodeB may form the identity number of user equipment by combining the extracted first part of the identity number with the extracted second part of the identity number.

18 Claims, 7 Drawing Sheets

FIG. 1

MCC    Mobile Country Code
MNC    Mobile Network Code
MSIN    Mobile Station Identification Number
NMSI    National Mobile Station Identity
IMSI    International Mobile Station Identity

SYSTEM AND METHOD FOR OBTAINING IDENTITY NUMBER OF USER EQUIPMENT IN AN LTE SYSTEM

CROSS REFERENCE TO PRIOR APPLICATIONS

The present application claims priority under 35 U.S.C. §119 to Korean Patent Application No. 10-2010-0090710 (filed on Sep. 15, 2010), which is hereby incorporated by reference in its entirety.

FIELD OF THE INVENTION

Apparatuses and methods consistent with the present invention relate to a long term evolution (LTE) system, and more particularly, to an eNodeB that obtains an identity number of a user equipment in an LTE system.

BACKGROUND OF THE INVENTION

In a typical mobile communication system, a base station controller obtains identity numbers of user equipments from a switching station and manages the obtained identity numbers. For example, international mobile station identities (IMSI) of user equipments are obtained and managed to uniquely identify user equipments in the typical mobile communication system. Based on such IMSIs of the user equipments, the base station controller stores and manages messages corresponding to each user equipment when the messages are generated for managing problems caused and/or for providing services in the typical mobile communication system.

In a long term evolution (LTE) system, an evolved Node B (eNodeB) functions as a base station controller as well as a base station. Unlike the base station controller in the typical mobile communication system, the eNodeB in the LTE system does not have a function for obtaining and/or managing identity numbers of user equipments. Since the eNodeB cannot obtain identity numbers of user equipments, the eNodeB cannot manage messages corresponding to user equipments although messages may be generated for managing problems caused in the eNodeB or for providing services to user equipments in the LTE network.

Similar to the base station controller in the typical mobile communication system, the eNodeB may be required to obtain and/or manage identity numbers of user equipments because it may be necessary to store and/or manage messages created during a call process in order to deal with problems caused in an LTE network or in order to identify supplementary services provided to user equipment in the LTE network.

For example, the eNodeB exchanges signals with the user equipments and processes the signals for performing various operations such as authenticating subscribers, managing locations of user equipments in a corresponding wireless network, and/or providing wireless voice and data services to user equipments in a corresponding wireless network. Furthermore, the eNodeB may interwork with upper level networks, such as a packet switch network or a data network in order to provide related services. In order to process signals and provide services, the eNodeB needs to store and/or manage messages generated when problems are caused during a call process in a corresponding wireless network. For example, a log message such as call fault message may be created when a problem is generated during a call process. The eNodeB may analyze such a log message to determine whether such a problem is caused by a system or by a user equipment.

Furthermore, an eNodeB in an LTE network may provide supplementary services to user equipments in a corresponding wireless network by interworking with upper level network devices such as a mobility management entity (MME) and/or a serving gateway (S-GW). Accordingly, the eNodeB may need to have basic information on user equipments as well as an MME and/or an S-GW. In order to have basic information on user equipments, an eNodeB may use identity numbers of user equipments to recognize locations of user equipments in a corresponding wireless network.

As described above, an eNodeB may be able to use identity numbers of user equipments. However, an eNodeB in an LTE network does not typically have a function of obtaining an identity number of a user equipment. The eNodeB in the LTE system may obtain a system architecture evolution (SAE) temporary mobile subscriber identity (S-TMSI). Unlike the IMSI, the S-TMSI may be changed by a page zone or by a region. The eNodeB cannot uniquely identify user equipments based on the S-TMSI. Therefore, there is a need for developing a method for obtaining and managing identity numbers of user equipments at an eNodeB in an LTE network.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an eNodeB in an LTE network may obtain an identity number of a user equipment.

In accordance with another aspect of the present invention, an identity number of a user equipment may be divided into two parts and separately transmitted to an eNodeB in an LTE network.

In accordance with still another aspect of the present invention, an eNodeB in an LTE network may receive a first part of an identity number of a user equipment from the user equipment, receive a second part of the identity number from a MME, and combine the received first part and the received second part to form the identity number of the user equipment.

In accordance with an embodiment of the present invention, an identity number of a user equipment may be obtained at an eNodeB in an LTE network having an MME. In order to obtain the identity number, a first message may be received from the user equipment and a first part of an identity number of the user equipment may be extracted from the received first message. A second message may be received from the MME and a second part of the identity number of the user equipment may be extracted from the second message. The identity number of user equipment may be formed by combining the extracted first part of the identity number with the extracted second part of the identity number.

The first message may include a radio resource control (RRC) connection setup request message transmitted from the user equipment, and the first part of the identity number may be included in an MME temporal mobile subscriber identity (M-TMSI) included in the RRC connection setup request message.

The identity number may include a mobile station identification number (MSIN) of an international mobile station identity (IMSI), and the first part of the identity number may include an upper eight bits of the MSIN.

The user equipment may be configured to insert the upper eight bits of the MSIN into an undefined eight bits of the M-TMSI of a globally unique temporary identity (GUTI) allocated to the user equipment by the MME during an attach procedure or a tracking area update procedure, load the M-TMSI into the RRC connection setup request message, and transmit the RRC connection setup request message to the eNodeB.

The second message may include an initial context setup request message transmitted from the MME to the eNodeB in response to an initial UE message, and the second part of the identity number may be included in a mobility management entity user equipment S1 application protocol ID (MME UE S1AP ID) included in the initial context setup request message.

The identity number may include a mobile station identification number (MSIN) of an international mobile station identity (IMSI), and the second part of the identity number may include a lower 30 bits of the MSIN.

The MME may be configured to insert the lower 30 bits of the MSIN into 30 bits of the MME UE S1AP ID allocated to the user equipment by the MME during a context setup procedure, load the MME UE S1AP ID into the initial context setup request message, and transmit the initial context setup request message to the eNodeB.

The second message may include a handoff request message transmitted from a source eNodeB, and the second part of the identity number may be included in a mobility management entity user equipment S1 application protocol ID (MME UE S1AP ID) included in the handoff request message.

The identity number may include a mobile station identification number (MSIN) of an international mobile station identity (IMSI), and the second part of the identity number may be a lower 30 bits of the MSIN.

The source eNodeB may be configured to insert a lower 30 bits of the MSIN into 30 bits of a mobility management entity user equipment S1 application protocol ID (MME UE S1AP ID), load the MME UE S1AP ID into the handoff request message, and transmit the handoff request message to the eNodeB.

In accordance with another embodiment of the present invention, an identity number of a user equipment in an LTE system having an eNodeB and an MME may be obtained. In order to obtain the identity number of the user equipment, the user equipment may insert a first part of a mobile station identification number (MSIN) of a user equipment into a mobile management entity temporal mobile subscriber identity (M-TMSI) of a globally unique temporary identity (GUTI) and transmit the M-TMSI to the eNodeB using a radio resource control (RRC) connection request message. The eNodeB may extract the first part of the MSIN from the M-TMSI. The MME may insert a second part of the MSIN of the user equipment into a mobility management entity user equipment S1 application protocol ID (MME UE S1AP ID) and transmit the MME UE S1AP ID having the second part of the MSIN using an initial context setup request message. The eNodeB may extract the second part of the MSIN from the MME UE S1AP ID. The eNodeB may form a complete MSIN of the user equipment by combining the first and second parts of the MSIN and store the complete MSIN of the user equipment.

When the user equipment initiates handoff from the eNodeB to a target eNodeB, the eNodeB may insert the second part of the MSIN of the user equipment into the MME UE S1AP ID and transmit the MME UE S1AP ID having the second part of the MSIN using a handoff request message to the target eNodeB. The target eNodeB may extract the second part of the MSIN from the MME UE S1AP ID included in the handoff request message. The target eNodeB may receive the RRC connection request message from the user equipment and extract the first part of the MSIN from the M-TMSI included in the RRC connection request message. The target eNodeB may form the complete MSIN of the user equipment by combining the first and second parts of the MSIN and storing the complete MSIN of the user equipment.

In accordance still another embodiment of the present invention, a system may obtain an identity number of a user equipment in an LTE network. The system may include a user equipment, a MME, and an eNodeB. The user equipment may be configured to insert a first part of the identity number of the user equipment into a first message. The MME may be configured to insert a second part of the identity number of the user equipment into a second message. The eNodeB may be configured to receive the first message from the user equipment and the second message from the MME, extract the first part of the identity number from the received first message, extract the second part of the identity number from the received second message, and form a complete identity number of the user equipment by combining the extracted first and second parts.

The eNodeB may include a call processor, a first extractor, a second extractor, and a combiner. The call processor may be configured to receive the first message from the user equipment and receive the second message from the MME. The first extractor may be configured to receive the first message from the call processor and extract the first part of the identity number of the user equipment from the first message. The second extractor may be configured to receive the second message from the call processor and extract the second part of the identity number of the user equipment from the second message. The combiner may be configured to receive the extracted first part from the first extractor and the extracted second part from the second extractor and combine the extracted first and second parts to form the complete identity number.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, an eNodeB in an LTE network may obtain an identity number of a user equipment, such as a mobile station identification number (MSIN). The MSIN may be included in an international mobile subscriber identity (IMSI). Throughout the specification, the MSIN will be described as an identity number of a user equipment, but the present invention is not limited thereto. Any number that can uniquely identify a user equipment regardless of a page zone or a region can be used as an identity number of a user equipment. Hereinafter, the MSIN of the IMSI will be described in detail with reference to FIGS. 1 and 2.

Figure 1:
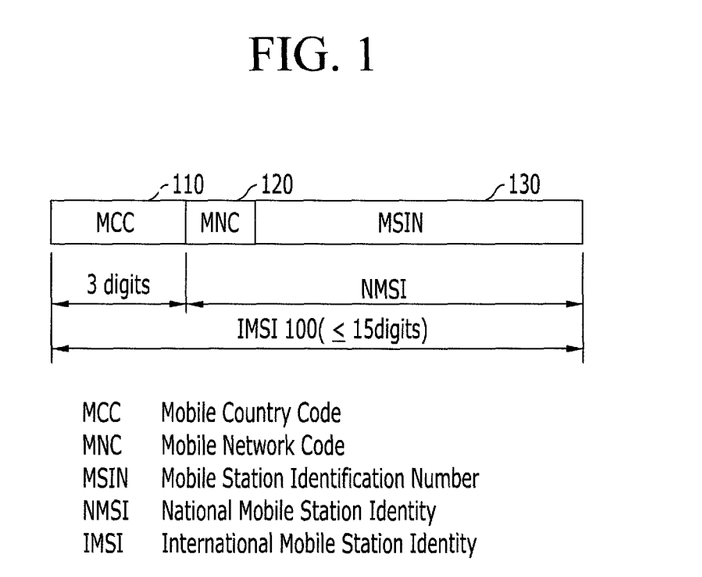
FIG. 1 illustrates an international mobile subscriber identity (IMSI)

FIG. 1 illustrates an international mobile subscriber identity (IMSI).

Referring to FIG. 1, the IMSI 100 may include a mobile country code (MCC) 110, a mobile network code (MNC) 120, and a mobile station identification number (MSIN) 130. The MCC 110 may be a country code, and the MNC 120 may be a service provider code. The combination of the MNC 120 and the MSIN 130 may be referred to as a national mobile station identity (NMSI).

An eNodeB can uniquely identify a user equipment when the eNodeB obtains at least the MSIN 130 of a corresponding user equipment, because the MSIN 130 is a unique identity number for each service provider. Accordingly, the eNodeB may obtain the MSIN 130 as an identity number of a user equipment, in accordance with an embodiment of the present invention. The MSIN 130 may be a ten-digit number. The MSIN 130 may be expressed by 34 bits. The MSIN 130 will be described in more detail with reference to FIG. 2.

Figure 2:
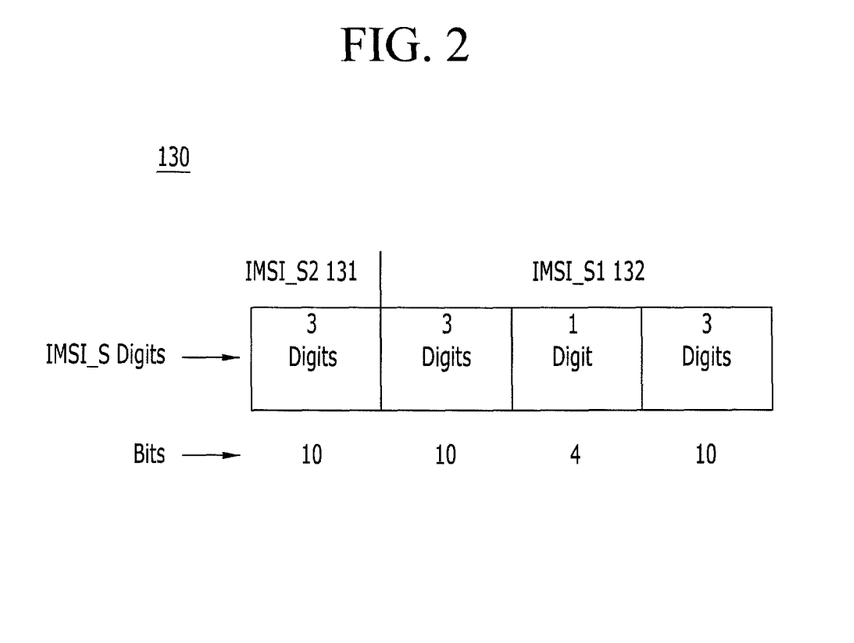
FIG. 2 illustrates in more detail the mobile station identification number (MSIN) of FIG. 1.

FIG. 2 illustrates in more detail the MSIN of FIG. 1.

As illustrated in FIG. 2, the MSIN 130 may be a ten-digit number and consist of 32 bits. The MSIN 130 may be referred to as a short IMSI (IMSI_S). The IMSI_S may include IMSI_S1 131 and IMSI_S2 132. The IMSI_S1 131 may be a three-digit number and consist of 10 bits. The IMSI_S2 132 may be divided into three parts. The first part may be a three-digit number and consist of 10 bits, the second part may be a one-digit number and consist of four bits, and the third part may be a three-digit number and consist of 10 bits.

In accordance with an embodiment of the present invention, such an MSIN 130 of a user equipment may be divided, separately inserted into messages exchanged during an initial call setup procedure and/or a handoff procedure, and separately transmitted to the eNodeB without violating formats of messages and protocols defined in related technical specifications of the LTE international standard. For example, the divided parts of the MSIN 130 may be inserted into a mobile management entity temporal mobile subscriber identity (M-TMSI) and a mobility management entity user equipment S1 application protocol ID (MME UE S1AP ID). The eNodeB may receive the message having the M-TMSI and another message having the MME UE S1AP ID, extract the divided parts of the MSIN from the M-TMSI and the MME UE S1AP ID, and obtain the complete MSIN by combining the extracted parts together.

Hereinafter, a system for obtaining an identity number of a user equipment in an LTE network, in accordance with an embodiment of the present invention, will be described with reference to FIG. 3. For convenience and ease of understanding, an MSIN will be described as an identity number of a user equipment, but the present invention is not limited thereto.

Figure 3:
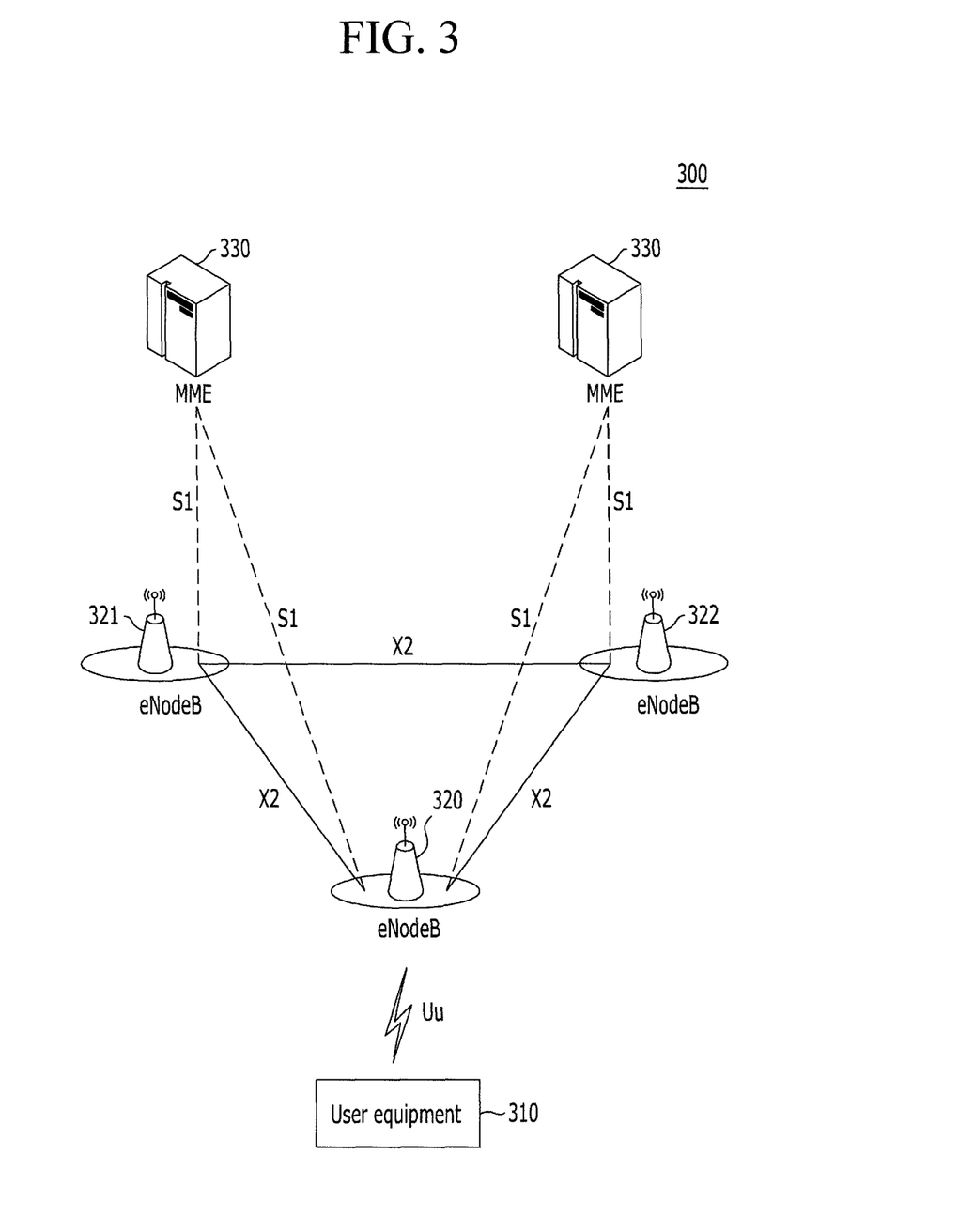
FIG. 3 illustrates a system for obtaining an identity number of a user equipment in an LTE network, in accordance with an embodiment of the present invention.

FIG. 3 illustrates a system for obtaining an identity number of a user equipment in an LTE network, in accordance with an embodiment of the present invention.

Referring to FIG. 3, the system 300 may include a user equipment 310, an evolved node B (eNodeB) 320, and at least one mobility management entity (MME) 330. The system 300 may further include eNodeBs 321 and 322.

The user equipment 310 may access the eNodeB 320 and transmit/receive data through the eNodeB 320 in the LTE network. For example, the user equipment 310 may transmit and receive data through a radio channel of a 2 GHz frequency band according to a radio access protocol. Furthermore, the user equipment 310 may perform a multiple access control (MAC) function. The user equipment 310 may communicate with the eNodeB 320 through a Uu interface.

In accordance with an embodiment of the present invention, the user equipment 310 may transmit a part of an MSIN thereof to the eNodeB 320 using an M-TMSI during an initial call setup procedure. The M-TMSI may be included in a global unique temporary identity (GUTI). The GUTI may be an identity that is allocated to the user equipment 310 by a corresponding MME 330 in the LTE network. For example, the corresponding MME 330 may allocate the GUTI to the user equipment 310 during an attach procedure or a tracking area update procedure. Table 1 shows, in more detail, a structure of the GUTI.

TABLE 1

| classification | GUTI | | | | |
| --- | --- | --- | --- | --- | --- |
| | GUMMEI | | | | |
| | | | MME identifier | | |
| | MCC | MNC | MME Group ID | MME Code | M-TMSI |
| Length | 24 bits | 16 bits | 16 bits | 8 bits | 32 bits |

When the user equipment 310 receives and/or transmits a call, the user equipment 310 may use an S-TMSI in the GUTI. The S-TMSI is a system architecture evolution (SAE) temporal mobile subscriber identity. The S-TMSI may include the MME code and the M-TMSI. The M-TMSI is a temporal identity number used for uniquely identifying user equipments within one tracking area. As shown in Table 1, the M-TMSI may include 32 bits. Among the 32 bits of the M-TMSI, 24 bits of the M-TMSI may be defined for interacting with packet (P)-TMSI of an existing communication system. However, the remaining eight bits of the M-TMSI are undefined. The user equipment 310 may use the undefined eight bits of the M-TMSI to transfer a part of the MSIN to the eNodeB 320, in accordance with an embodiment of the present invention. For example, the user equipment 310 may set the undefined eight bits of the M-TMSI for an upper eight bits of the MSIN. Table 2 illustrates a bit structure of the M-TMSI, in accordance with an embodiment of the present invention. As shown in Table 2 below, $0^{th}$ to $15^{th}$ and $24^{th}$ to $31^{st}$ bits are set as tracking area unique indicators for interacting with the P-TMSI, and $16^{th}$ to $23^{rd}$ bits are set for an upper eight bits of the MSIN of the user equipment 310. The $16^{th}$ to $23^{rd}$ bits are undefined according to a related international standard.

TABLE 2

| 31 | 30 | ... | 24 | 23 | ... | 16 | 15 | ... | 0 |
|----|----|----|----|----|----|----|----|----|----|
| 8 bits | | | | 8 bits | | | 16 bits | | |
| Tracking area unique indicator Interact with a bit map of P-TMSI | | | | Upper 8-bits of MSIN | | | Tracking area unique indicator Interact with a bit map of P-TMSI | | |

After setting the undefined bits of the M-TMSI for the upper eight bits of the MSIN, the user equipment 310 may transmit the M-TMSI to the eNodeB 320 using a radio resource control (RRC) connection request message. In more detail, the RRC connection request message may be transmitted to the eNodeB 320 during an initial call setup procedure. When the user equipment 310 transmits the RRC connection request message, the user equipment 310 loads the S-TMSI including at least of an MCC and the M-TMSI in the RRC connection request message. Accordingly, the user equipment 310 may set the undefined eight bits of the M-TMSI for the upper eight bits of the MSIN and transmit the M-TMSI with the RRC connection request message to the eNodeB 320 during the initial call setup procedure. The eNodeB 320 may receive the RRC connection request message and extract the upper eight bits of the MSIN of the user equipment 310 from the M-TMSI of the received RRC connection request message.

The MME 330 may be a control node for the LTE network. The MME 330 may perform tracking and paging procedure including retransmission. The MME 330 may further perform authentication and registration of the user equipment 310 when the user equipment 310 initially accesses an LTE network. The MME 330 may process a service request from the user equipment 310 and guarantee mobility when the user equipment 310 moves from the eNodeB 320 to another eNodeB 321 or 322. The MME 330 may also allocate the GUTI to the user equipment 310 during an attach procedure or a tracking area update procedure, as described above.

After transmitting the upper 8-bits of the MSIN of the user equipment 310, the MME 330 may transmit the remaining part of the MSIN of the user equipment 310 to the eNodeB 320 using an MME UE S1AP ID in an initial context setup request message. The MME UE S1AP ID may be an identity that is allocated to a user equipment so as to uniquely identify the user equipment over an S1 interface within the corresponding MME 330. The user equipment 310 may maintain one MME UE S1AP ID within one MME. When the user equipment 310 moves to another MME, a new MME UE S1AP ID may be allocated to the user equipment. The MME 330 may generate such an MME UE S1AP ID by setting bits of the MME UE S1AP ID for the remaining part of the MSIN of the user equipment 310. Table 3 shows, in more detail, an MME UE S1AP ID in accordance with an embodiment of the present invention.

TABLE 3

| MME UE S1AP ID | | | | | | | |
|---|---|---|---|---|---|---|---|
| 31 | 30 | 29 | ... | 6 | ... | 1 | 0 |
| UE Unique ID | | Lower 30 bits of MSIN | | | | | |

As illustrated in Table 3, the MME UE S1AP ID may consist of 32 bits. In accordance with an embodiment of the present invention, the MME 330 may set 30 bits of the MME UE S1AP ID for the lower 30 bits of the MSIN of the user equipment 310 and set two bits for an identifier of the user equipment 310. For example, the $31^{st}$ and $30^{th}$ bits may be set for a UE unique ID for the user equipment 310, and the $0^{th}$ to the $29^{th}$ bits may be set for the lower 30 bits of an MSIN of the user equipment 310. Such an MME UE S1AP ID may be used for identifying ($2^2+2^{30}$) user equipments within one MME 330.

After setting bits of the MME UE S1AP ID for the remaining part of the MSIN of the user equipment 310, the MME 330 may transmit the MME UE S1AP ID to the eNodeB 320 using the initial context setup request message. The initial context setup request message may be transmitted in response to an initial UE message that is transmitted to the MME 330 after an RRC setup procedure. The eNodeB 320 may obtain the remaining part of the MSIN of the user equipment 310 from the MME UE S1AP ID included in the initial context setup request message. The eNodeB 120 may combine the upper eight bits of the MSIN extracted from the M-TMSI of the RRC connection request message and the lower 30 bits of the MSIN extracted from the MME UE S1AP ID of the initial context setup request message to form the complete MSIN of the user equipment 310. In accordance with an embodiment of the present invention, 30 bits of the MME UE S1AP ID may be used to transmit the part of the MSIN of the user equipment 310, but the present invention is not limited thereto. For example, 26 bits of the MME UE S1AP ID may be used with the MSIN consisting of 34 bits and the upper 8 bits of the MSIN are already transmitted using the M-TMSI.

As described above, the eNodeB 320 can obtain the MSIN of the user equipment 310 during an initial call setup procedure in accordance with an embodiment of the present invention. When the user equipment 310 performs handoff from the eNodeB 320 to an eNodeB 321, the target eNodeB 321 may also need to obtain the MSIN of the user equipment 310. As described above, the source eNodeB 320 has already obtained the MSIN of the user equipment 310. The source eNodeB 320, however, cannot transmit the entire MSIN of the user equipment 310 to the target eNodeB 321 while maintaining the format of the message as defined in a related technical specification of the LTE international standard. According to the related technical specification, only MME UE S1AP ID can be transmitted using a handoff request message during a handoff procedure. In accordance with an embodiment of the present invention, the source eNodeB 320 may set 30 bits of the MME UE S1AP ID for the lower 30 bits of the MSIN of the user equipment 310, load the MME UE S1AP ID into the handoff request message, and transmit the handoff request message to the target eNodeB 321. When the target eNodeB 321 receives the handoff request message from the source eNodeB 320, the target eNodeB 321 may obtain the lower 30 bits of the MSIN of the user equipment 310 from the MME UE S1AP ID in the initial context setup request message. After the handoff procedure, the target eNodeB 321 may obtain the upper eight bits of the MSIN of the user equipment 310 while performing the RRC setup procedure as described above.

The eNodeB 320 may be an access node for an LTE network. The eNodeB 320 may perform a function for initial access of the user equipment 310, a function for handoff between sectors, and/or a function for controlling quality of service (QoS). The eNodeB 320 may receive radio signals from a plurality of user equipments and transfer the received radio signals to an intended MME 330. The eNodeB 320 may receive various types of information from an MME 330, convert the received information to a radio signal, and transfer the radio signal to the user equipment 310. The eNodeB 320 may communicate with the MME 330 over an S1 interface. The eNodeB 320 may communicate with other eNodeBs 322 or 321 over an X2 interface.

In accordance with an embodiment of the present invention, the eNodeB 320 may receive an RRC connection request message from the user equipment 310 and extract a part of an MSIN of the user equipment 310 from the M-TMSI included in the RRC connection request message. The eNodeB 320 may also receive an initial context setup message from the MME 330 and extract the remaining part of the MSIN of the user equipment 310 from the MME UE S1AP ID included in the initial context setup message. The eNodeB 320 may combine the extracted bits together and form a complete MSIN of the user equipment 310. As described above, the eNodeB 320 may obtain the MSIN of the user equipment 310 so as to manage and store messages generated for managing problems caused in and/or for providing services to the LTE network, in accordance with an embodiment of the present invention. Hereinafter, the eNodeB 320 will be described in more detail with reference to FIG. 4.

Figure 4:
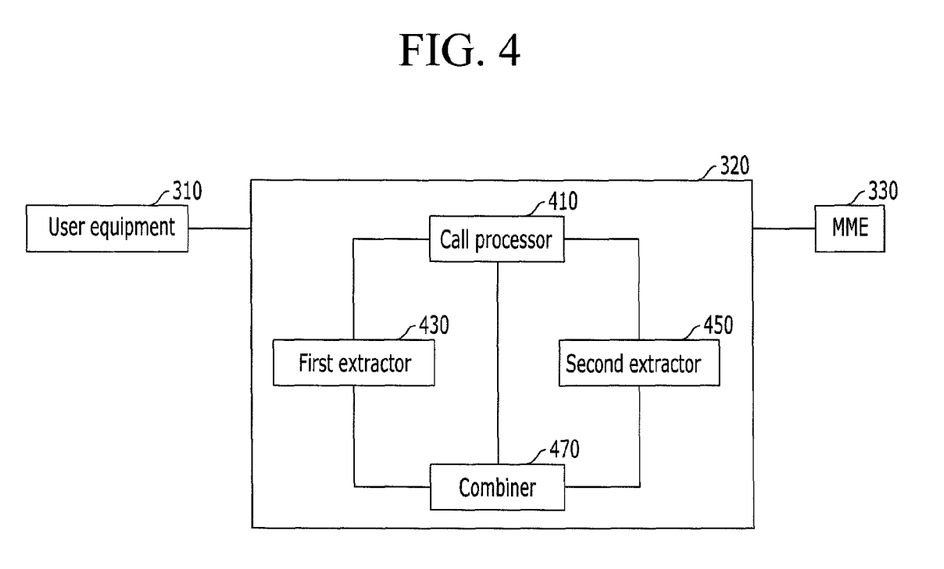
FIG. 4 illustrates in more detail an eNodeB of FIG. 3, in accordance with an embodiment of the present invention.

FIG. 4 illustrates, in more detail, the eNodeB 320 of FIG. 3, in accordance with an embodiment of the present invention.

Referring to FIG. 4, the eNodeB 320 may include a call processor 410, a first extractor 430, a second extractor 450, and a combiner 470.

The call processor 410 may be coupled to the user equipment 310 and the MME 330 and may process a call for a communication service. The call processor 410 may further perform a radio bearer control function, a radio accept control function, a mobility control function, and a radio resource management control function for dynamically allocating resources to the user equipment 310. The call processor 410 may also compress an IP header, interpret a data stream, and schedule and transmit a paging message.

In accordance with an embodiment of the present invention, the call processor 410 may transfer an M-TMSI included in an RRC connection request message to the first extractor 430 when the eNodeB 320 receives the RRC connection request message from the user equipment 310.

Furthermore, the call processor 410 may transfer an MME UE S1AP ID included in an initial context setup request message to the second extractor 450 when the eNodeB 320 receives the initial context setup request message from the MME 330 in response to an initial UE message.

The first extractor 430 may receive the M-TMSI from the call processor 410 and extract a first part of the MSIN of the user equipment 310 from the M-TMSI. The first part may be the upper eight bits of the MSIN of the user equipment 310. The first extractor 430 may transfer the extracted first part of the MSIN to the combiner 470.

The second extractor 450 may receive the MME UE S1AP ID from the call processor 410 and extract the second part of the MSIN of the user equipment 310 from the MME UE S1AP ID. For example, the second part of the MSIN may be the lower 30 bits of the MSIN. The second extractor 450 may transfer the extracted second part of the MSIN of the user equipment 310 to the combiner 470.

The combiner 470 may receive the extracted first part of the MSIN from the first extractor 430 and receive the second part of the MSIN from the second extractor 450. The combiner 470 may combine the received first and second parts together and form the complete MSIN of the user equipment 310. After combining, the combiner 470 may store the MSIN of the user equipment 310.

After forming and storing the MSIN of the user equipment 310, the call processor 410 may generate a log message about problems generated in the LTE network during the call process. Accordingly, problems may be managed by a user equipment based on the log messages.

Hereinafter, a method for obtaining an identity number of a user equipment at an eNodeB in an LTE network, in accordance with an embodiment of the present invention will be described with reference to FIG. 5.

Figure 5:
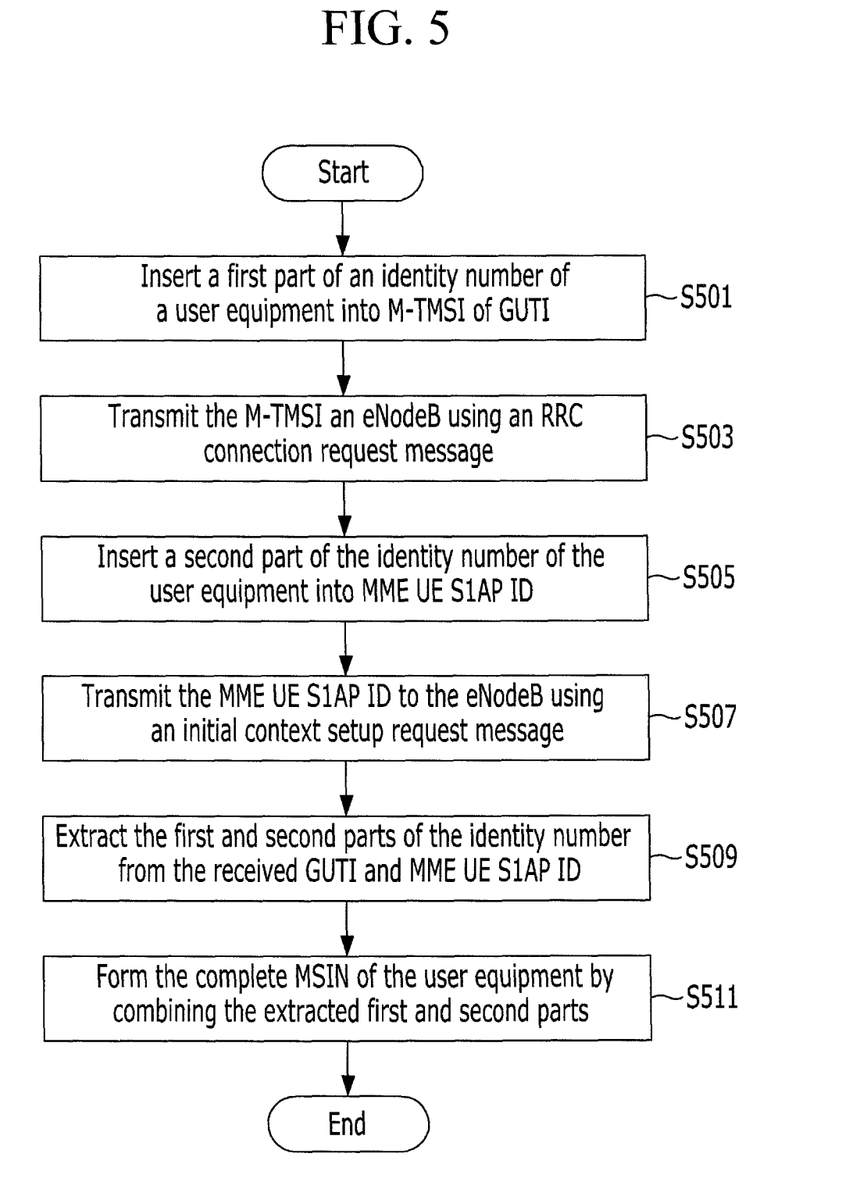
FIG. 5 illustrates a method for obtaining an identity number of a user equipment, in accordance with an embodiment of the present invention.

FIG. 5 illustrates a method for obtaining an identity number of a user equipment, in accordance with an embodiment of the present invention.

Referring to FIG. 5, during an initial call setup procedure, a first part of an identity number of a user equipment may be inserted into an M-TMSI of the GUTI S501. For example, an MME 330 may allocate a GUTI to the user equipment 310 during an attach procedure or a tracking area update procedure. After allocation, the user equipment 310 may set undefined bits of an M-TMSI in the GUTI for the upper eight bits of the MSIN of the user equipment 310.

The M-TMSI may be transmitted to an eNodeB using an RRC connection request message S503. For example, after setting the M-TMSI, the user equipment 310 may transmit the M-TMSI to the eNodeB 320 using the RRC connection request message.

A second part of the identity number of the user equipment may be inserted into an MME UE S1AP ID S505. For example, the MME UE S1AP ID may be included in an initial context setup request message. The MME 330 may set 30 bits of the MME UE S1AP ID for the lower 30 bits of the MSIN of the user equipment 310.

The MME UE S1AP ID may be transmitted to the eNodeB using an initial context setup request message S507. For example, the MME 330 may transmit the MME UE S1AP ID to the eNodeB 320 using the initial context setup request message. The initial context setup request message may be transmitted in response to an initial UE message.

The first and second parts of the identity number of the user equipment 310 may be extracted from the received M-TMSI and MME UE S1AP ID S509. For example, the eNodeB 320 may receive the RRC connection request message from the user equipment 310 and receive the initial context setup request message. The eNodeB 320 may extract the upper eight bits of the MSIN from the M-TMSI in the RRC connection request message. The eNodeB 320 may extract the lower 30 bits of the MSIN from the MME UE S1AP ID in the initial context setup request message.

The extracted first and second parts of the identity number may be combined together so as to form a complete identity number of the user equipment S511. For example, the eNodeB 320 may combine the upper eight bits extracted from the M-TMSI and the lower 30 bits extracted from MME UE S1AP ID to form the complete MSIN of the user equipment 310. The eNodeB 320 may store the formed MSIN of the user equipment 310 in a memory.

Hereinafter, a method for obtaining an identity number of a user equipment in accordance with an embodiment of the present invention will be described in detail with reference to FIGS. 6 to 8.

Figure 6:
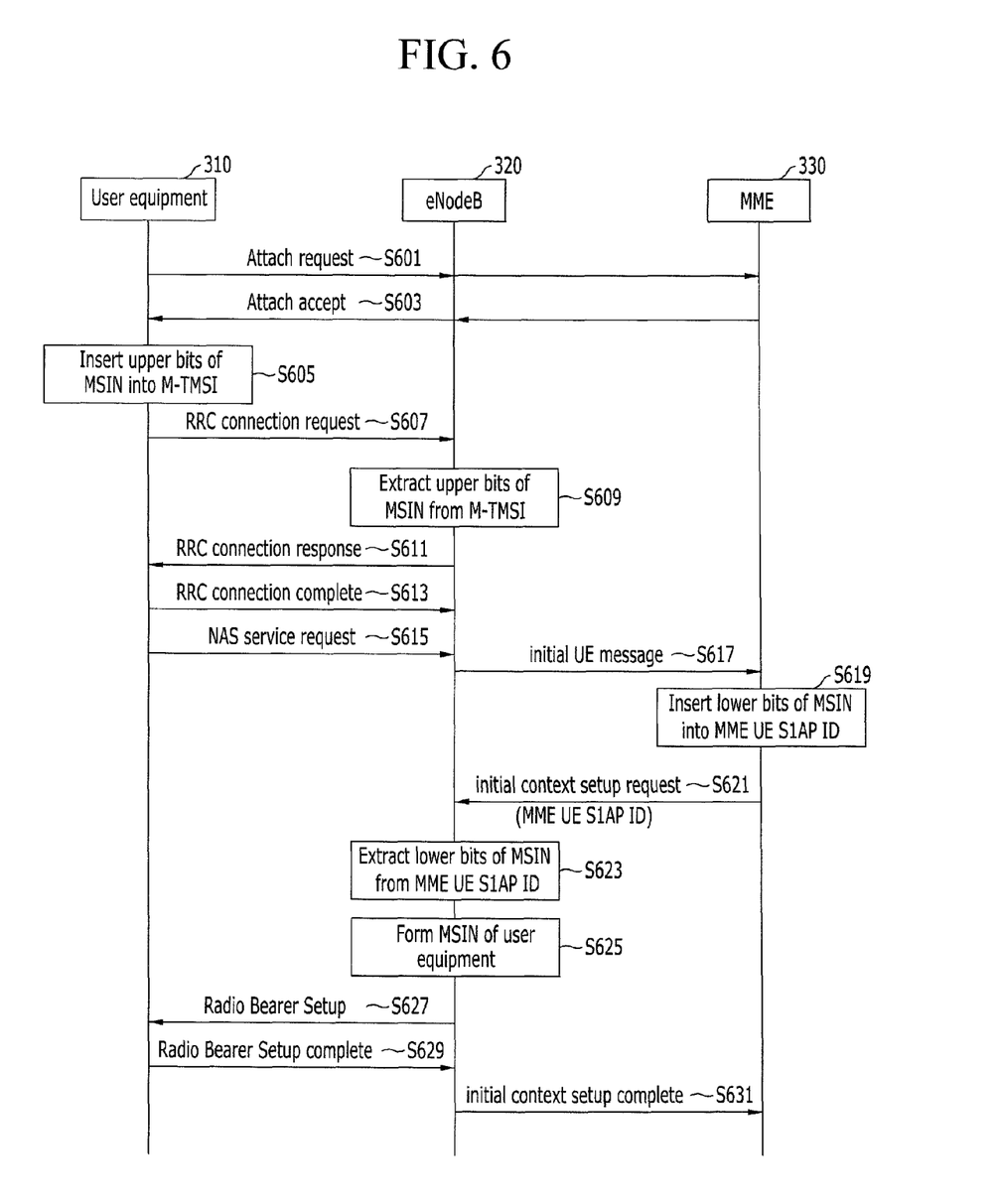
FIG. 6 illustrates a method for obtaining an identity number of a user equipment at an eNodeB of an LTE system using a mobile management entity temporal mobile subscriber identity (M-TMSI) of a global unique temporary identity (GUTI) allocated during an attach procedure, in accordance with an embodiment of the present invention.

FIG. 6 illustrates a method for obtaining an identity number of a user equipment at an eNodeB of an LTE system using an M-TMSI of a GUTI allocated during an attach procedure, in accordance with an embodiment of the present invention.

Referring to FIG. 6, an attach procedure may be performed when a user equipment 310 is turned on in the LTE network. That is, the user equipment 310 may transmit an attach request message to an MME 330 through an eNodeB 320 in order to initially access the LTE network S601. When the MME 330 does not have an IMSI of the user equipment 310, the MME 330 may request the IMSI of the user equipment 310. In response to the request, the MME 330 may receive the IMSI from the user equipment 310.

After receiving the attach request message, the MME 330 may perform a location update procedure for updating a location of the user equipment 310 and transmit an attach accept message to the user equipment 310 S603. When the attach accept message is transmitted to the user equipment 310, the MME 330 may allocate the GUTI to the user equipment 310.

The GUTI allocated to the user equipment 310 may include an M-TMSI. As described above, the M-TMSI may consist of 32 bits including an undefined eight bits. The user equipment 310 may set the undefined eight bits of an M-TMSI as an upper eight bits of an MSIN of the user equipment 310 S605.

The user equipment 310 may load an S-TMSI consisting of an MME code and the M-TMSI in an RRC connection request message and transmit the RRC connection request message to the eNodeB 320 S607.

The eNodeB 320 may receive the RRC connection request message from the user equipment 310 and extract the upper eight bits of the MSIN from the M-TMSI in the received RRC connection request message S609.

The eNodeB 320 may transmit an RRC connection response message to the user equipment 310 in response to the RRC connection request message S611. The user equipment 310 may transmit an RRC connection complete message to the eNodeB 320 in response to the RRC connection response message S613. By setting the RRC connection, a channel may be formed between the user equipment 310 and the eNodeB 320 to transmit access stratum (AS) control information and non-access stratum (NAS) control information.

After the RRC connection setup procedure, the user equipment 310 may transmit a NAS service request message to the eNodeB 320 S615. The eNodeB 320 may transmit an initial UE message to the MME 330 S617.

When the MME 330 receives the initial UE message, the MME 330 may generate an MME UE S1AP ID including the lower 30 bits of the MSIN of the user equipment 310 S619. As described above, the MME UE S1AP ID may be an identifier of the user equipment 310 within one MME 330 which uniquely identifies the user equipment 310 within the one MME 330. The MME UE S1AP ID may consist of 32 bits. The MME 330 may set 30 bits of the MME UE S1AP ID as the lower 30 bits of the MSIN of the user equipment 310.

The MME 330 may load the MME UE S1AP ID into an initial context setup request message and transmit the initial context setup request message to the eNodeB 320 in response to the initial UE message S621.

The eNodeB 320 may receive the initial context setup request message and extract the lower 30 bits of the MSIN of the user equipment 310 from the MME UE S1AP ID included in the received initial context setup request message S623.

The eNodeB may obtain a complete MSIN of the user equipment 310 by combining the upper eight bits extracted from the M-TMSI and the lower 30 bits extracted from the MME UE S1AP ID S625.

After obtaining the complete MSIN of the user equipment 110, the eNodeB 320 may transmit a radio bearer setup message to the user equipment 310 S627 and receive a radio bearer setup complete message from the user equipment 110 S629 in response to the radio bearer setup message. Accordingly, a radio bearer may be set up for data transmission in this fashion. After completing set up of the radio bearer, the eNodeB 120 may transmit an initial context setup complete message to the MME 130 S631.

As described above, in accordance with an embodiment of the present invention, the eNodeB 320 may obtain a part of the MSIP of the user equipment 310 by using the M-TMSI of the GUTI allocated to the user equipment 310 during the attach procedure and obtain the remaining part of the MSIP using the MME UE S1AP ID allocated to the user equipment 310 during the initial context setup procedure. Then, the eNodeB 320 may finally obtain the complete MSIP of the user equipment 310 by combining the obtained parts of the MSIP together.

Figure 7:
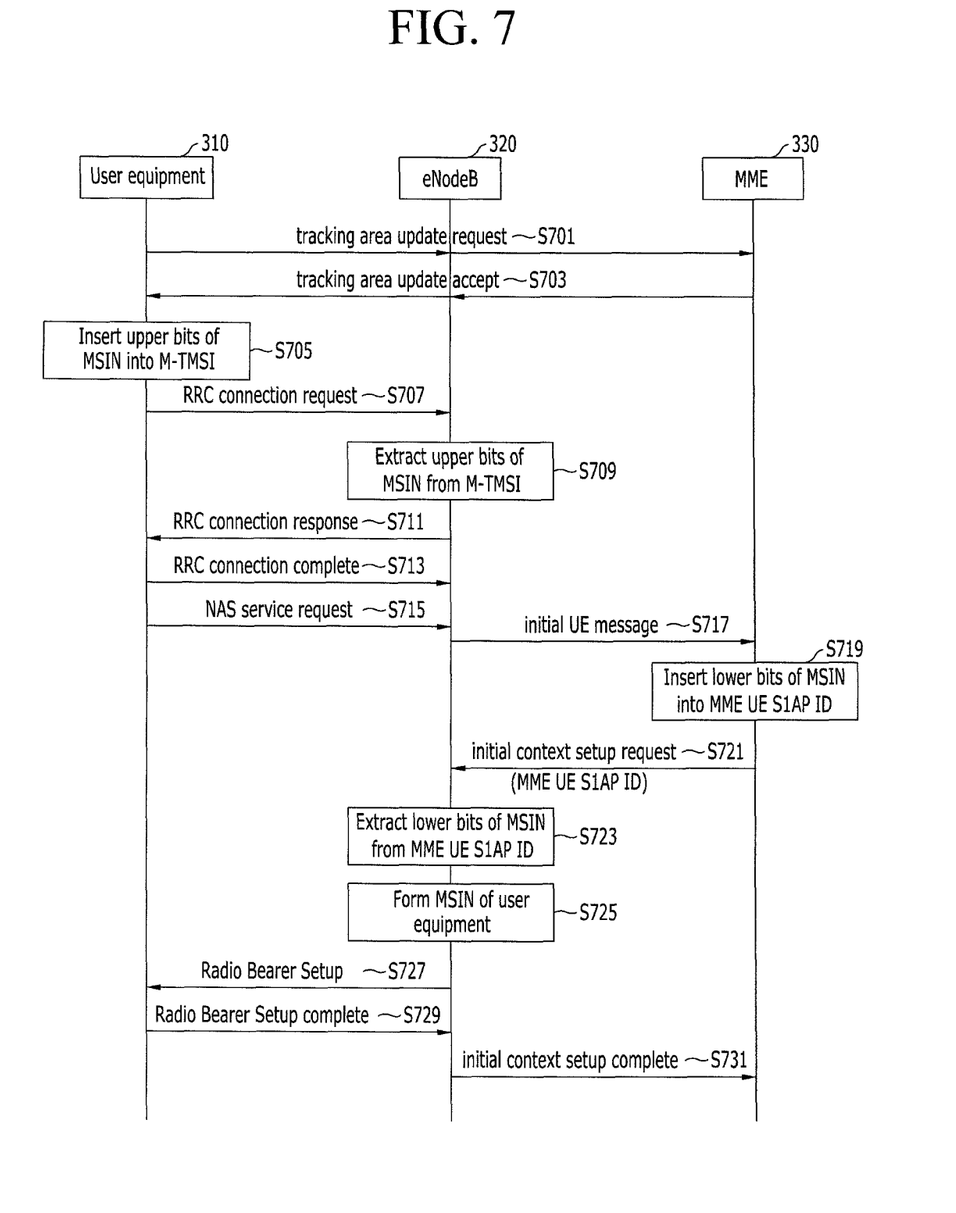
FIG. 7 illustrates a method for obtaining an identity number of a user equipment at an eNodeB of an LTE system using an M-TMSI of a GUTI allocated during a tracking area update procedure, in accordance with an embodiment of the present invention.

FIG. 7 illustrates a method for obtaining an identity number of a user equipment at an eNodeB of an LTE system using an M-TMSI of a GUTI allocated during a tracking area update procedure, in accordance with an embodiment of the present invention.

Referring to FIG. 7, the user equipment 310 may perform a tracking area update procedure when a tracking area is changed. In the tracking area update procedure, the user equipment 310 may transmit a tracking area update request message to the MME 330 through the eNodeB 320 S701. The tracking area update request message may be included in an old GUTI previously allocated to the user equipment 310.

After receiving the tracking area update request message, the MME 330 may perform location registration for updating tracking area information of the user equipment 310 and transmit a tracking area update accept message to the user equipment 310 S703. The tracking area update accept message may include a new GUIT allocated by the MME 330.

The user equipment 310 may receive the new GUTI from the MME 330 in this fashion. As described above, the GUTI may include an M-TMSI. As also described above, the M-TMSI may consist of 32 bits including an undefined eight bits. The user equipment 310 may set the undefined eight bits of the M-TMSI as an upper eight bits of the MSIN of the user equipment 310 S705.

The user equipment 310 may load an S-TMSI consisting of an MME code and the M-TMSI in an RRC connection request message and transmit the RRC connection request message to the eNodeB 320 in order to use a communication service S707.

The eNodeB 320 may receive the RRC connection request message from the user equipment 310 and extract the upper eight bits of the MSIN from the M-TMSI in the received RRC connection request message S709.

The eNodeB 320 may transmit an RRC connection response message to the user equipment 310 in response to the RRC connection request message S711. The user equipment 310 may transmit an RRC connection complete message to the eNodeB 320 in response to the RRC connection response message S713. By setting the RRC connection, a channel may be formed between the user equipment 310 and the eNodeB 320 to transmit AS control information and NAS control information.

After the RRC connection setup procedure, the user equipment 310 may transmit a NAS service request message to the eNodeB 320 S715. The eNodeB 320 may transmit an initial UE message to the MME 330 S717.

When the MME 330 receives the initial UE message, the MME 330 may generate an MME UE S1AP ID including the lower 30 bits of the MSIN of the user equipment 310 S719. As described above, the MME UE S1AP ID may be an identifier of the user equipment 310 within one MME 330 which uniquely identifies the user equipment 310 within the one MME 330. The MME UE S1AP ID may consist of 32 bits. The MME 330 may set 30 bits of the MME UE S1AP ID as the lower 30 bits of the MSIN of the user equipment 310.

The MME 330 may load the MME UE S1AP ID into an initial context setup request message and transmit the initial context setup request message to the eNodeB 320 in response to the initial UE message S721.

The eNodeB 320 may receive the initial context setup request message and extract the lower 30 bits of the MSIN of the user equipment 310 from the MME UE S1AP ID included in the received initial context setup request message S723.

The eNodeB may obtain a complete MSIN of the user equipment 310 by combining the upper eight bits extracted from the M-TMSI and the lower 30 bits extracted from the MME UE S1AP ID S725.

After obtaining the complete MSIN of the user equipment 110, the eNodeB 320 may transmit a radio bearer setup message to the user equipment 310 S727 and receive a radio bearer setup complete message from the user equipment 110 S729 in response to the radio bearer setup message. Accordingly, a radio bearer may be set up for data transmission in this fashion. After completing set up of the radio bearer, the eNodeB 320 may transmit an initial context setup complete message to the MME 130 S731.

As described above, in accordance with an embodiment of the present invention, the eNodeB 320 may obtain a part of the MSIP of the user equipment 310 by using the GUTI newly allocated to the user equipment 310 during the tracking area update procedure and obtain the remaining part of the MSIP using the MME UE S1AP ID allocated to the user equipment 310 during the initial context setup procedure. Then, the eNodeB 320 may finally obtain the complete MSIP of the user equipment 310 by combining the obtained parts of the MSIP together.

As described above, the eNodeB 320 may obtain the MSIN of the user equipment 310 using the GUTI allocated to the user equipment during the attach procedure and during the tracking area update procedure. When the user equipment 310 performs handoff from the eNodeB 320 to an eNodeB 321, the target eNodeB 321 may also need to obtain the MSIN of the user equipment 310. Hereinafter, a method for obtaining an identity number of a user equipment at an eNodeB of an LTE system after a handoff procedure, in accordance with an embodiment of the present invention will be described with reference to FIG. 8.

Figure 8:
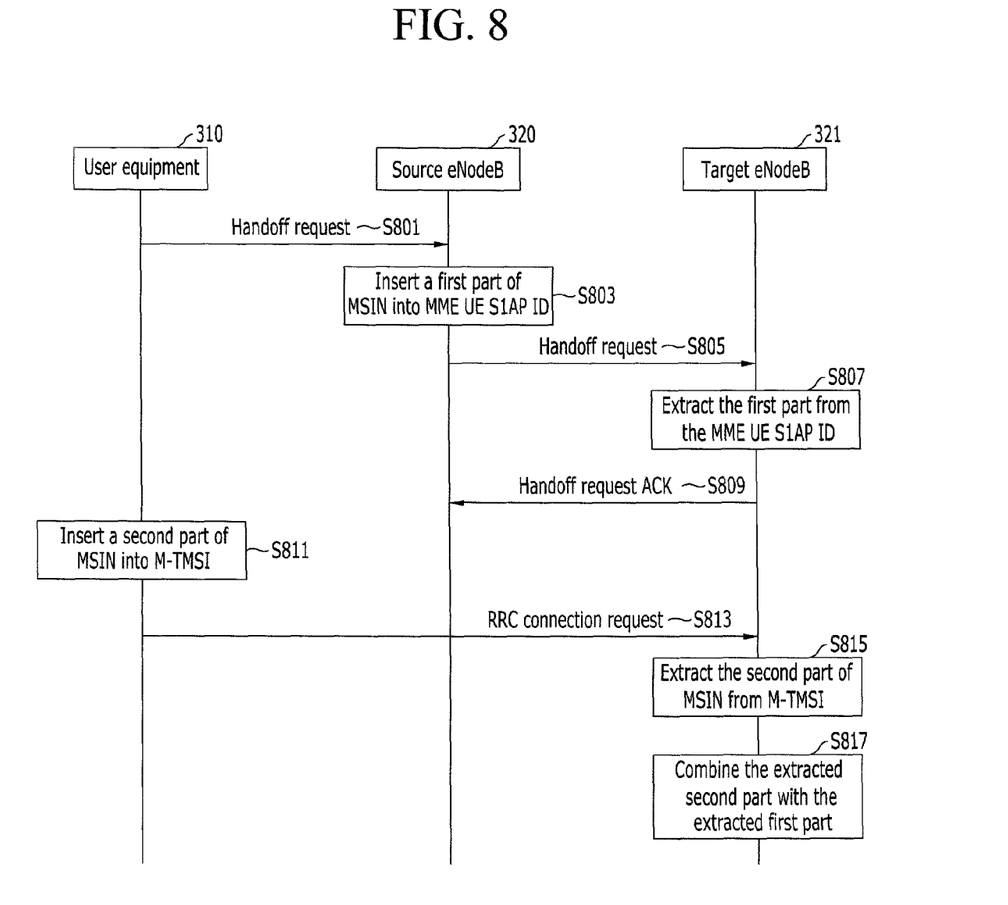
FIG. 8 illustrates a method for obtaining an identity number of a user equipment at an eNodeB of an LTE system after handoff is performed, in accordance with an embodiment of the present invention.

FIG. 8 illustrates a method for obtaining an identity number of a user equipment at an eNodeB of an LTE system after handoff is performed, in accordance with an embodiment of the present invention.

Referring to FIG. 8, the user equipment 310 may perform handoff when a signal strength of the current eNodeB 320 falls below a certain level. That is, the user equipment 310 may perform handoff from a source eNodeB 320 to a target eNodeB 321 when the user equipment 310 finds the target eNodeB 321 that transmits a signal having a proper signal strength. In order to initiate handoff, the user equipment 310 may transmit a handoff request message to the source eNodeB 320 S801.

The source eNodeB 320 may have the MSIN of the user equipment 310, in accordance with embodiments of the present invention. The source eNodeB 320, however, cannot transmit the entire MSIN of the user equipment 310 to the target eNodeB 321 using an existing message defined in the related technical specification of the LTE international standard. According to the related technical specification, only MME UE S1AP ID can be transmitted using a handoff request message during a handoff procedure. Accordingly, the source eNodeB 320 may insert a first part of the MSIN of the user equipment 310 into 30 bits of the MME UE S1AP ID S803 when the source eNodeB 320 receives the handoff request message from the user equipment 310. The first part may be a lower 30 bits of the MSIN of the user equipment 310. The source eNodeB 320 may load the MME UE S1AP ID having the first part of the MSIN of the user equipment 310 into the handoff request message and transfer the handoff request message to the target eNodeB 321 S805.

The target eNodeB 321 may receive the handoff request message and extract the first part of the MSIN of the user equipment 310 from the MME UE S1AP ID of the handoff request message S807. The target eNodeB 321 may transmit a handoff request acknowledge (ACK) message to the source eNodeB 320 in response to the handoff request message S809.

After the handoff procedure, the user equipment 310 may insert a second part of the MSIN into an M-TMSI S811 and transmit an RRC connection request message with the M-TMSI to the target eNodeB 321 S813 for receiving a communication service using the target eNodeB 321. The second part of the MSIN may be upper eight bits of the MSIN.

The target eNodeB 321 may receive the RRC connection request message and extract the second part, such as the upper eight bits of the MSIN, from the M-TMSI in the RRC connection request message S815. The target eNodeB 321 may form a complete MSIN of the user equipment 310 by combining the second part such as the upper eight bits extracted from the RRC connection request message, and the first part such as the lower 30 bits extracted from the handoff request message S817.

In accordance with an embodiment of the present invention, an eNodeB may obtain identity numbers of user equipments as described above. Based on the obtained identity numbers of the user equipments, the eNodeB may manage problems, which are generated during a call process, corresponding to each user equipment. Accordingly, the eNodeB may easily determine whether a user equipment causes a problem or a system causes a problem by managing the problems by each user equipment.

In accordance with an embodiment of the present invention, an eNodeB may obtain identity numbers of user equipments without violating formats of messages and protocols defined in technical specifications of the LTE international standard.

In accordance with embodiments of the present invention, the method for obtaining an identity number of a user equipment at an eNodeB in an LTE network may be realized as a program and stored in a computer-readable recording medium such as a CD-ROM, a RAM, a ROM, floppy disks, hard disks, magneto-optical disks, and the like. Since the process can be easily implemented by those skilled in the art to which the present invention pertains, further description will not be provided herein.

The term "coupled" has been used throughout to mean that elements may be either directly connected together or may be coupled through one or more intervening elements.

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for obtaining an identity number of a user equipment at an evolved node B (eNodeB) in a long term evolution (LTE) network having a mobility management entity (MME), the method comprising:
receiving, by the eNodeB, a first message from the user equipment;
extracting, by the eNodeB, a first part of an identity number of the user equipment from the received first message;
receiving, by the eNodeB, a second message from the MME;
extracting, by the eNodeB, a second part of the identity number of the user equipment from the second message; and
forming, by the eNodeB, the identity number of the user equipment by combining the extracted first part of the identity number with the extracted second part of the identity number,
wherein:
the first message comprises a radio resource control (RRC) connection setup request message transmitted from the user equipment;
the first part of the identity number is included in an MME temporal mobile subscriber identity (M-TMSI) included in the RRC connection setup request message;
the identity number comprises a mobile station identification number (MSIN) of an international mobile station identity (IMSI); and
the first part of the identity number comprises an upper eight bits of the MSIN.

2. The method of claim 1, wherein the user equipment is configured to insert the upper eight bits of the MSN into an undefined eight bits of the M-TMSI of a globally unique temporary identity (GUTI) allocated to the user equipment by the MME during an attach procedure or a tracking area update procedure, load the M-TMSI into the RRC connection setup request message, and transmit the RRC connection setup request message to the eNodeB.

3. The method of claim 1, wherein:
the second message comprises an initial context setup request message transmitted from the MME to the eNodeB in response to an initial UE message; and
the second part of the identity number is included in a mobility management entity user equipment S1 application protocol ID (MME UE S1AP ID) included in the initial context setup request message.

4. The method of claim 3, wherein the identity number comprises a mobile station identification number (MSIN) of an international mobile station identity (IMSI), and the second part of the identity number comprises a lower 30 bits of the MSIN.

5. The method of claim 4, wherein the MME is configured to insert the lower 30 bits of the MSIN into 30 bits of the MME UE S1AP ID allocated to the user equipment by the MME during a context setup procedure, load the MME UE S1AP ID into the initial context setup request message, and transmit the initial context setup request message to the eNodeB.

6. The method of claim 1, further comprising:
receiving, by the eNodeB, a handoff request message transmitted from a source eNodeB,
wherein the second part of the identity number is included in a mobility management entity user equipment S1 application protocol ID (MME UE S1AP ID) included in the handoff request message.

7. The method of claim 6, wherein the identity number comprises a mobile station identification number (MSIN) of an international mobile station identity (IMSI), and the second part of the identity number is a lower 30 bits of the MSIN.

8. The method of claim 6, wherein the source eNodeB is configured to insert a lower 30 bits of the MSIN into 30 bits of a mobility management entity user equipment S1 application protocol ID (MME UE S1AP ID), load the MME UE S1AP ID into the handoff request message, and transmit the handoff request message to the eNodeB.

9. A method for obtaining an identity number of a user equipment in a long term evolution (LTE) system having an evolved node B (eNodeB) and a mobility management entity (MME), the method comprising:
inserting, at the user equipment, a first part of a mobile station identification number (MSIN) of a user equipment into a mobile management entity temporal mobile subscriber identity (M-TMSI) of a globally unique temporary identity (GUTI);
transmitting, at the user equipment, the M-TMSI to the eNodeB using a radio resource control (RRC) connection request message to the eNodeB;
extracting, at the eNodeB, the first part of the MSIN from the M-TMSI included in the RRC connection request message;
inserting, at the MME, a second part of the MSIN of the user equipment into a mobility management entity user equipment S1 application protocol ID (MME UE S1AP ID);
transmitting, at the MME, the MME UE S1AP ID having the second part of the MSIN to the eNodeB using an initial context setup request message;
extracting, at the eNodeB, the second part of the MSIN from the MME UE S1AP ID included in the initial context setup request message; and
forming, at the eNodeB, a complete MSIN of the user equipment by combining the first and second parts of the MSIN and storing the complete MSIN of the user equipment.

10. The method of claim 9, wherein the user equipment is configured to insert the first part of the MSIN into undefined bits of the M-TMSI of the GUTI allocated to the user equipment during an attach procedure or a tracking area update procedure, load the M-TMSI into the RRC connection setup request message, and transmit the RRC connection setup request message to the eNodeB.

11. The method of claim 9, wherein the MME is configured to insert the second part of the MSIN into a part of the MME UE S1AP ID allocated to the user equipment during a context setup procedure, load the MME UE S1AP ID into the initial context setup request message, and transmit the initial context setup request message to the eNodeB.

12. The method of claim 9, further comprising:
inserting, at the eNodeB, the second part of the MSIN of the user equipment into the MME UE S1AP ID when the user equipment initiates handoff from the eNodeB to a target eNodeB;
transmitting, at the eNodeB, the MME UE S1AP ID having the second part of the MSIN using a handoff request message to the target eNodeB;
extracting, at the target eNodeB, the second part of the MSIN from the MME UE S1AP ID included in the handoff request message;
receiving, at the target eNodeB, the RRC connection request message from the user equipment and extracting the first part of the MSIN from the M-TMSI included in the RRC connection request message; and
forming, at the target eNodeB, the complete MSIN of the user equipment by combining the first and second parts of the MSIN and storing the complete MSIN of the user equipment.

13. A system for obtaining an identity number of a user equipment in a long term evolution (LTE) network, the system comprising:
a user equipment configured to insert a first part of the identity number of the user equipment into a first message;
a mobility management entity (MME) configured to insert a second part of the identity number of the user equipment into a second message; and
an evolved node B (eNodeB) configured to receive the first message from the user equipment and the second message from the MME, extract the first part of the identity number from the received first message, extract the second part of the identity number from the received second message, and form a complete identity number of the user equipment by combining the extracted first and second parts,
wherein:
the first message comprises a radio resource control (RRC) connection setup request message;
the first part of the identity number is included in an MME temporal mobile subscriber identity (M-TMSI) included in the RRC connection setup request message;
the identity number comprises a mobile station identification number (MSIN) of an international mobile station identity (IMSI); and
the first part of the identity number comprises an upper eight bits of the MSIM.

14. The system of claim 13, wherein
the user equipment is configured to insert the upper eight bits of the MSIN into an undefined eight bits of the M-TMSI of a globally unique temporary identity (GUTI) allocated to the user equipment by the MME during an attach procedure or a tracking area update procedure, load the M-TMSI into the RRC connection setup request message, and transmit the RRC connection setup request message to the eNodeB.

15. The system of claim 13, wherein:
the second message comprises an initial context setup request message;
the second part of the identity number is included in a mobility management entity user equipment S1 application protocol ID (MME UE S1AP ID) included in the initial context setup request message;
the identity number comprises a mobile station identification number (MSIN) of an international mobile station identity (IMSI), and the second part of the identity number comprises a lower 30 bits of the MSIN; and
the MME is configured to insert the lower 30 bits of the MSIN into 30 bits of the MME UE S1AP ID allocated to the user equipment by the MME during a context setup procedure, load the MME UE S1AP ID into the initial context setup request message, and transmit the initial context setup request message to the eNodeB.

16. The system of claim 13, wherein the eNodeB is configured to:
insert the second part of the MSIN of the user equipment into a mobility management entity user equipment S1 application protocol ID (MME UE S1AP ID) when the user equipment initiates handoff from the eNodeB to a target eNodeB; and
transmit the MME UE S1AP ID having the second part of the MSIN using a handoff request message to the target eNodeB.

17. The system of claim 16, wherein the target eNodeB is configured to:
extract the second part of the MSIN from the MME UE S1AP ID included in the handoff request message;
receive the RRC connection request message from the user equipment and extract the first part of the MSIN from the M-TMSI included in the RRC connection request message, and
form the complete MSIN of the user equipment by combining the first and second parts of the MSIN and store the complete MSIN of the user equipment.

18. The system of claim 13, wherein the eNodeB comprises:
a call processor configured to receive the first message from the user equipment and receive the second message from the MME;
a first extractor configured to receive the first message from the call processor and extract the first part of the identity number of the user equipment from the first message;
a second extractor configured to receive the second message from the call processor and extract the second part of the identity number of the user equipment from the second message; and
a combiner configured to receive the extracted first part from the first extractor and the extracted second part from the second extractor and combine the extracted first and second parts to form the complete identity number.

* * * * *